(12) United States Patent
Suzuki et al.

(10) Patent No.: US 8,045,155 B2
(45) Date of Patent: *Oct. 25, 2011

(54) SPECTROSCOPIC MODULE

(75) Inventors: Tomofumi Suzuki, Hamamatsu (JP);
Katsumi Shibayama, Hamamatsu (JP);
Takafumi Yokino, Hamamatsu (JP);
Masashi Ito, Hamamatsu (JP); Helmut Teichmann, Zurich (CH); Dietmar Hiller, Zurich (CH); Ulrich Starker, Zurich (CH)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/377,343

(22) PCT Filed: Jun. 5, 2008

(86) PCT No.: PCT/JP2008/060378
§ 371 (c)(1),
(2), (4) Date: Feb. 12, 2009

(87) PCT Pub. No.: WO2008/149940
PCT Pub. Date: Dec. 11, 2008

(65) Prior Publication Data
US 2010/0214563 A1      Aug. 26, 2010

(30) Foreign Application Priority Data

| Jun. 8, 2007 | (JP) | 2007-152966 |
| Jun. 8, 2007 | (JP) | 2007-153014 |
| Jun. 8, 2007 | (JP) | 2007-153019 |
| Jun. 8, 2007 | (JP) | 2007-153029 |
| Jun. 8, 2007 | (JP) | 2007-153039 |
| Sep. 13, 2007 | (JP) | 2007-238291 |

(51) Int. Cl.
*G01J 3/26* (2006.01)

(52) U.S. Cl. ....................................... 356/326
(58) Field of Classification Search .................. 356/326
See application file for complete search history.

(56) References Cited

U.S. PATENT DOCUMENTS 4,784,935 A    11/1988   Ehrfeld et al.
(Continued)

FOREIGN PATENT DOCUMENTS

CN          1800941         7/2006
(Continued)

OTHER PUBLICATIONS

F. Reininger, et al., "VIRTIS: Visible Infrared Thermal Imaging Spectrometer for the Rosetta Mission," Proceedings. SPIE, vol. 2819 [Imaging Spectrometry II], Aug. 1996, pp. 66-77.

(Continued)

*Primary Examiner* — Kara E Geisel
(74) *Attorney, Agent, or Firm* — Drinker Biddle & Reath LLP

(57) ABSTRACT

The spectroscopy module is provided with a body portion for transmitting light, a spectroscopic portion for dispersing light made incident from the front plane of the body portion into the body portion to reflect the light on the front plane, a light detecting element having a light detecting portion for detecting the light dispersed and reflected by the spectroscopic portion and electrically connected to a wiring formed on the front plane of the body portion by face-down bonding, and an underfill material filled in the body portion side of the light detecting element to transmit the light. The light detecting element is provided with a light-passing hole through which the light advancing into the spectroscopic portion passes, and a reservoir portion is formed on a rear plane of the body portion side in the light detecting element so as to enclose a light outgoing opening of the light-passing hole.

9 Claims, 6 Drawing Sheets

U.S. PATENT DOCUMENTS

| | | | |
|---|---|---|---|
| 5,026,160 A | | 6/1991 | Dorain et al. |
| 6,081,331 A | * | 6/2000 | Teichmann ............... 356/328 |
| 6,181,418 B1 | | 1/2001 | Palumbo et al. |
| 6,303,934 B1 | * | 10/2001 | Daly et al. ............... 250/339.02 |
| 6,862,092 B1 | | 3/2005 | Ibsen et al. |
| 7,092,090 B2 | * | 8/2006 | Shimizu et al. ............... 356/328 |
| 7,369,228 B2 | * | 5/2008 | Kerstan et al. ............... 356/328 |
| 7,605,917 B2 | * | 10/2009 | Teichmann et al. ............... 356/328 |
| 7,697,137 B2 | * | 4/2010 | Comstock, II ............... 356/326 |
| 2003/0197862 A1 | | 10/2003 | Cohen et al. |
| 2004/0196458 A1 | | 10/2004 | Shimizu et al. |
| 2004/0239931 A1 | | 12/2004 | Teichmann et al. |
| 2007/0252989 A1 | | 11/2007 | Comstock |
| 2009/0284741 A1 | | 11/2009 | Shibayama et al. |
| 2009/0290155 A1 | | 11/2009 | Shibayama et al. |
| 2010/0103412 A1 | | 4/2010 | Shibayama et al. |
| 2010/0201980 A1 | | 8/2010 | Shibayama et al. |
| 2010/0208257 A1 | | 8/2010 | Shibayama et al. |
| 2010/0208258 A1 | | 8/2010 | Shibayama et al. |
| 2010/0208259 A1 | | 8/2010 | Suzuki et al. |
| 2010/0238439 A1 | | 9/2010 | Suzuki et al. |

FOREIGN PATENT DOCUMENTS

| | | |
|---|---|---|
| DE | 197 17 015 | 10/1998 |
| JP | 54-143685 | 11/1979 |
| JP | 62-6126 | 1/1987 |
| JP | 63-229765 | 9/1988 |
| JP | 4-294223 | 10/1992 |
| JP | 5-322653 | 12/1993 |
| JP | 6-129908 | 5/1994 |
| JP | 6-229829 | 8/1994 |
| JP | 8-145794 | 6/1996 |
| JP | 2000-298066 | 10/2000 |
| JP | 3119917 | 10/2000 |
| JP | 2003-139611 | 5/2003 |
| JP | 2003-202463 | 7/2003 |
| JP | 2003-243444 | 8/2003 |
| JP | 2003-318478 | 11/2003 |
| JP | 2003-337206 | 11/2003 |
| JP | 2004-191246 | 7/2004 |
| JP | 2004-354176 | 12/2004 |
| JP | 2004-537750 | 12/2004 |
| JP | 2005-308495 | 11/2005 |
| JP | 2006-30031 | 2/2006 |
| WO | WO 99/53350 | 10/1999 |

OTHER PUBLICATIONS

U.S. Office Action dated Apr. 28, 2011 that issued in U.S. Appl. No. 12/377,350 including a Double Patenting Rejection on pp. 2-4.

* cited by examiner

SPECTROSCOPIC MODULE

TECHNICAL FIELD

The present invention relates to a spectroscopy module for dispersing light to detect the light.

BACKGROUND ART

As conventional spectroscopy modules, there are known, for example, those disclosed in Patent Documents 1 to 3. Patent Document 1 has disclosed a spectroscopy module which is provided with a light-transmitting supporting body, an incident slit portion which makes light incident into the supporting body, a concave diffraction grating for dispersing the light made incident into the supporting body to reflect the light, and a diode for defecting the light dispersed and reflected by the concave diffraction grating.

Patent Document 1: Japanese Published Unexamined Patent Application No. H04-294223
Patent Document 2: Japanese Published Unexamined Patent Application No. 2004-354176
Patent Document 3: Japanese Published Unexamined Patent Application No. 2003-243444

DISCLOSURE OF THE INVENTION

Problems to be Solved by the Invention

Nevertheless, in the spectroscopy module described in Patent document 1, upon attachment of the incident slit portion and the diode to the supporting body, there is a fear that a relative positional relationship between the incident slit portion and the diode may deviate, thus resulting in a decrease in reliability of the spectroscopy module.

Now, the present invention has been made in view of the above situation, an object of which is to provide a highly reliable spectroscopy module.

Means for Solving the Problems

In order to attain the above object, the spectroscopy module of the present invention is provided with a light-transmitting body portion, a spectroscopic portion for dispersing light made incident from a predetermined plane of the body portion into the body portion to reflect the light on the predetermined plane, a light detecting portion to detect the light dispersed and reflected by the spectroscopic portion, the light detecting element is electrically connected to wiring formed on the predetermined plane of the body portion by face-down bonding, and is provided with a light-transmitting underfill material filled in the body portion side of the light detecting element, the light detecting element is provided with a light passing hole through which the light advancing into the spectroscopic portion passes, and a reservoir portion is formed so as to enclose a light outgoing opening of the light passing hole on a plane of the body portion side of the light detecting element.

In the spectroscopy module, a light passing hole through which light advancing to the spectroscopic portion passes and a light detecting portion for detecting light dispersed and reflected by the spectroscopic portion are formed at the light detecting element. Therefore, it is possible to prevent the deviation of relative positional relationship between the light passing hole and the light detecting portion. Further, the light detecting element is electrically connected to wiring formed on the predetermined plane of the body portion by face-down bonding, and a light-transmitting underfill material is filled in the body portion side of the light detecting element. Therefore, the body portion and the light detecting element can be improved in mechanical strength and light which advances between the body portion and the light detecting element can also be adjusted for the refraction index. In this instance, where the underfill material filled between the light detecting element and the body portion advances into a light passing hole of the light detecting element, there is a case that light made incident into the light passing hole may be deflected or diffused, depending on the shape of the surface on the light incident side of the underfill material inside the light passing hole. In the present invention, a reservoir portion is formed so as to enclose a light outgoing opening of the light passing hole on a plane of the body portion side of the light detecting element. Thereby, the underfill material is reserved at the reservoir portion to prevent the underfill material from entering into the light passing hole. Therefore, light is not deflected or diffused by the underfill material but can be made incident into the body portion. Thus, according to the spectroscopy module, it is possible to improve the reliability.

In the spectroscopy module of the present invention, it is preferable that the wiring has a light absorbing layer on a predetermined plane. For example, where the wiring is directly formed on the predetermined plane of the body portion in order to attach the wiring to the body portion more firmly, thereby preventing the wiring from breaking or the like, the light absorbing layer can be used to prevent stray light from being reflected in a diffused manner due to the wiring.

In the spectroscopy module of the present invention, it is preferable that there is formed on a predetermined plane a light absorbing layer having a first light passing portion through which light advancing to the spectroscopic portion passes and a second light passing portion through which light advancing to the light detecting portion passes. In this instance, the light absorbing layer acts to suppress the generation of stray light and also absorb the stray light, thus making it possible to suppress the stray light from being made incident into the light detecting portion of the light detecting element.

The reservoir portion may be an annular groove formed so as to enclose a light outgoing opening and may be a recessed portion formed so as to include the light outgoing opening. In these instances, it is possible to form the reservoir portion in a simple structure.

It is preferable that the groove is formed so as to enclose the first light passing portion when viewed from the center line of the light passing hole. It is also preferable that the recessed portion is formed so as to include the first light passing portion when viewed from the center line of the light passing hole. In these instances, an underfill material is reserved on the groove or at the recessed portion to prevent the underfill material from entering into the first light passing portion of the light absorbing layer. Therefore, light is not deflected or diffused by the underfill material and the light can be made incident into the body portion.

EFFECT OF THE INVENTION

According to the present invention, it is possible to improve the reliability.

EXPLANATION OF REFERENCE NUMERALS

Figure 1:
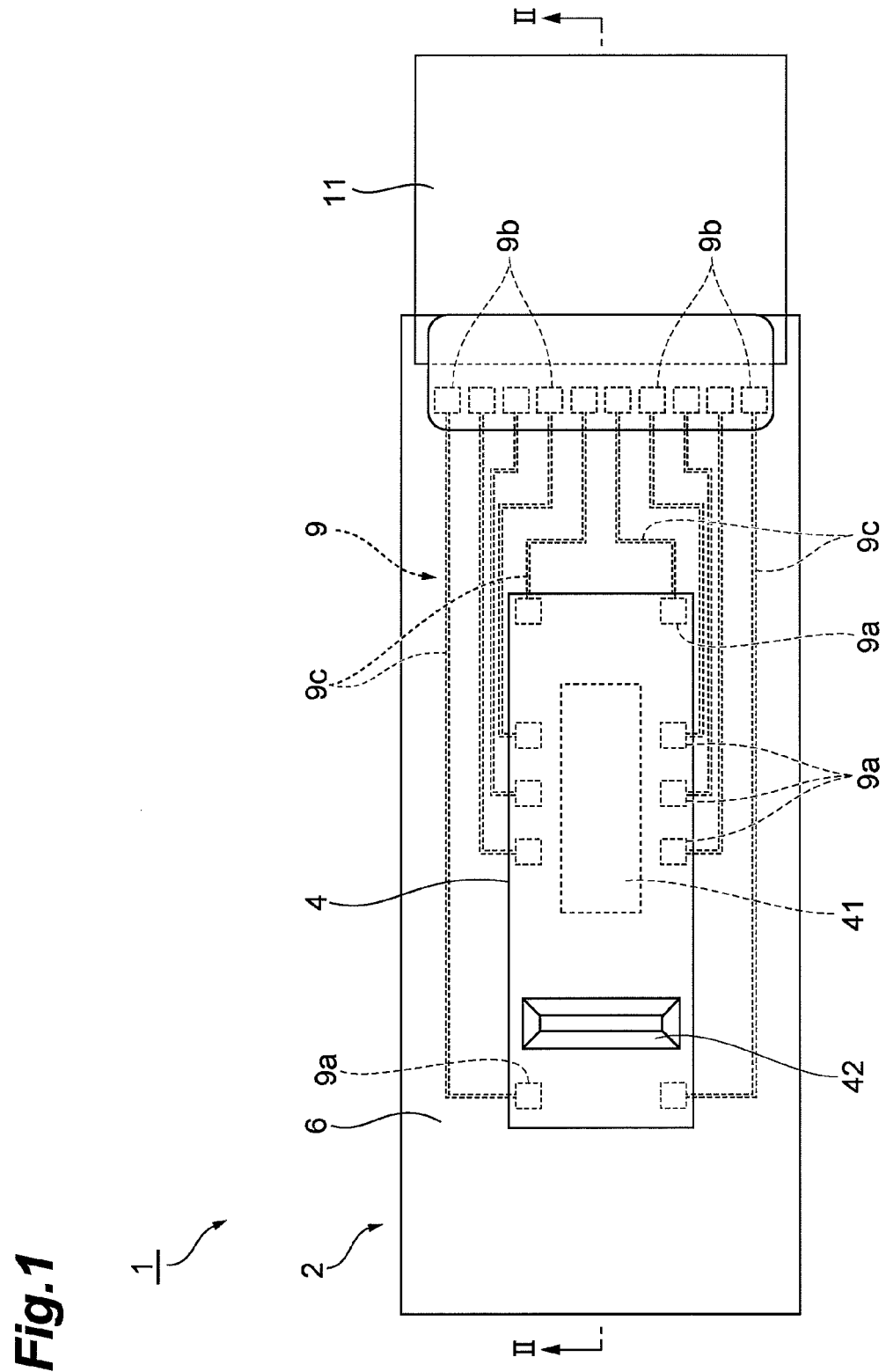
FIG. 1 is a plan view of a spectroscopy module of a first embodiment of the present invention.

1: spectroscopy module
2: body portion
2a: front plane (predetermined plane)
3: spectroscopic portion
4: light detecting element
4a: rear plane (plane on the body portion side)
6: light absorbing layer
6a: light passing portion (first light passing portion)
6b: light passing portion (second light passing portion)
9: wiring
9d: light absorbing layer
12: underfill material
16: light transmitting plate
41: light detecting portion
42: light passing hole
42b: light outgoing opening
43: reservoir portion
44: groove
45: recessed portion
CL: center line

BEST MODES FOR CARRYING OUT THE INVENTION

Hereinafter, a detailed description will be given for preferred embodiments of the present invention by referring to the drawings. It is noted that in the individual drawings, the same reference letters or numerals are given to the same and corresponding parts, with overlapping description omitted.

First Embodiment

Figure 2:
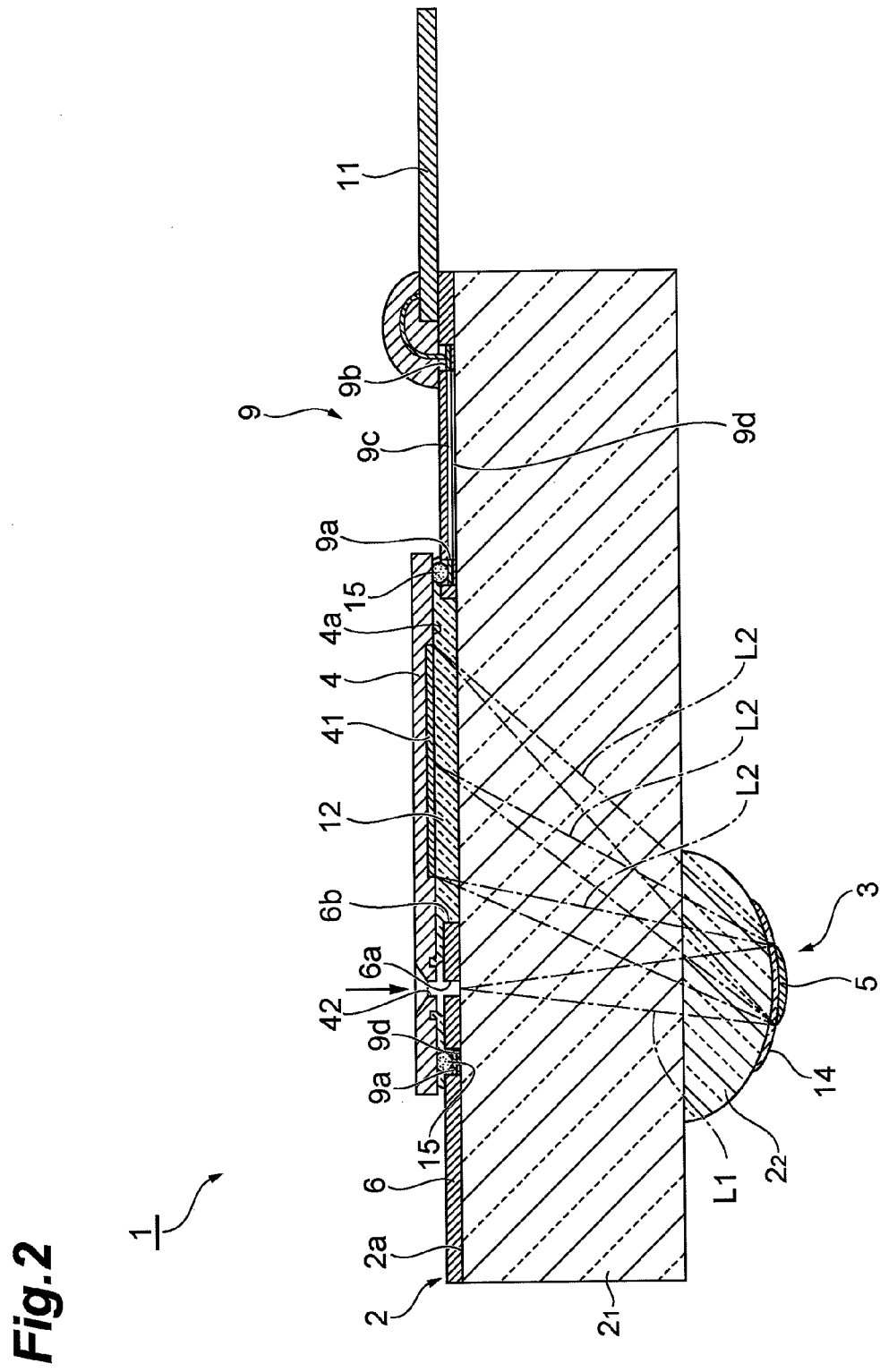
FIG. 2 is a cross sectional view of the spectroscopy module taken along line II to II given in FIG. 1.

FIG. 1 is a plan view of a spectroscopy module of a first embodiment of the present invention. FIG. 2 is a cross sectional view of the spectroscopy module taken along line II to II given in FIG. 1. As shown in FIG. 1 and FIG. 2, the spectroscopy module 1 is provided with a light-transmitting body portion 2, a spectroscopic portion 3 for dispersing light L1 made incident from a front plane (predetermined plane) 2a of the body portion 2 into the body portion 2 to reflect the light on the front plane 2a, and light detecting element 4 for detecting light L2 dispersed and reflected by the spectroscopic portion 3. The spectroscopy module 1 is to disperse the light L1 into a plurality of lights L2 by the spectroscopic portion 3 and detect the lights L2 by the light detecting element 4, thereby measuring the wavelength distribution of the light L1 and the intensity of a specific wavelength component or the like.

The body portion 2 is provided with a light-transmitting member $2_1$ formed in a rectangular plate shape by using a light-transmitting glass or a light-transmitting resin such as BK7, Pyrex (registered trade mark) or quartz and a light-transmitting member $2_2$ formed at a predetermined position on the rear plane of the light-transmitting member $2_1$. The light-transmitting member $2_2$ is formed by using the same material as that of the light-transmitting member $2_1$, that is, a light-transmitting organic-inorganic hybrid material or a light-transmitting low-melting temperature glass for replica molding in a predetermined shape (in this instance, a shape in which a hemisphere lens is cut out by two planes approximately orthogonal to the flat plane portion thereof and also approximately parallel to each other to give the side planes), thereby acting as a lens for forming an image on a light detecting portion 41 of the light detecting element 4 on the basis of light L2 dispersed and reflected by the spectroscopic portion 3. The light-transmitting member $2_2$ is arranged so that the side planes are approximately parallel with the longitudinal direction of the light-transmitting member $2_1$ and bonded to the light-transmitting member $2_1$ with an optical resin or by direct bonding, where it is made with the same material as that of the light-transmitting member $2_1$.

The spectroscopic portion 3 is a reflection type grating having a diffracting layer 14 formed on the outer surface of the light-transmitting member $2_2$ and a reflecting layer 5 formed on the outer surface of the diffracting layer 14. The diffracting layer 14 is a serrated cross-sectional blazed grating, a rectangular cross-sectional binary grating, a sinusoidal cross-sectional holographic grating or the like. The diffracting layer 14 is formed, for example, by coating a photosensitive resin on the outer surface of the light-transmitting member $2_2$ and then using a light-transmitting mold (grating mold) made of quartz or the like to subject the photosensitive resin to UV curing. The diffracting layer 14 is made more stable when heated and cured after the UV curing. The reflecting layer 5 is formed in a film shape, for example, by evaporating Al, Au or the like on the outer surface of the diffracting layer 14. Further, a protective layer made with $SiO_2$, $MgF_2$ or the like may be formed on the reflecting layer 5. It is noted that materials of the diffracting layer 14 shall not be limited to photosensitive resins but may include photosensitive glass, photosensitive organic-inorganic hybrid materials, heat-deformable resins/glass and organic-inorganic hybrid materials, etc.

The light detecting element 4 is provided with a light detecting portion 41 in which long photodiodes are arrayed one-dimensionally in a direction approximately orthogonal to the longitudinal direction thereof to detect light L2 dispersed and reflected by the spectroscopic portion 3 and a light passing hole 42 which is installed together with the light detecting portion 41 in a direction at which the photodiodes are arranged one dimensionally and through which light L1 advancing to the spectroscopic portion 3 passes. The light passing hole 42 is a slit extending in a direction approximately orthogonal to the longitudinal direction of the light-transmitting member $2_1$ and formed by etching, blasting or laser processing etc., in a state that it is positioned at a high accuracy with respect to the light detecting portion 41. The light detecting element 4 is arranged in such a manner that a direction at which the photodiodes are arrayed one dimensionally is approximately in agreement with the longitudinal direction of the light-transmitting member $2_1$ and also the light detecting portion 41 turns to the front plane 2a of the body portion 2. It is noted that the light detecting element 4 shall not be limited to the photodiode array but may include a C-MOS image sensor, a CCD image sensor or the like.

On the front plane 2a (more specifically, the front plane of the light-transmitting member $2_1$) of the body portion 2, there is formed a wiring 9 made of a single film of Al, Au or the like or a laminated film of Ti—Pt—Au, Ti—Ni—Au, Cr—Au or the like. The wiring 9 is provided with a plurality of pad portions 9a arranged at the center of the light-transmitting member $2_1$, a plurality of pad portions 9b arranged at the end of the light-transmitting member $2_1$ in the longitudinal direction and a plurality of connection portions 9c for connecting the corresponding pad portions 9a and the pad portions 9b. Further, the wiring 9 is provided on the front plane 2a of the body portion 2 with a light absorbing layer 9d made of a single film of CrO or the like or a laminated film of Cr—CrO or the like.

Further, on the front plane 2a of the body portion 2, there is formed a light absorbing layer 6 so as to expose the pad portions 9a, 9b of the wiring 9 and also cover the connection portions 9c of the wiring 9.

The light absorbing layer 6 is provided with a light passing portion (first light passing portion) 6a through which light L1 advancing to the spectroscopic portion 3 passes and a light passing portion (second light passing portion) 6b through which light L2 advancing to the light detecting portion 41 of the light detecting element 4 passes. The light passing portion 6a is a slit extending in a direction approximately orthogonal to the longitudinal direction of the light-transmitting member $2_1$. The light absorbing layer 6 is subjected to a predetermined-shaped patterning and formed integrally by using CrO, a CrO-containing laminated film, black resist or the like.

An external terminal of the light detecting element 4 is electrically connected to the pad portion 9a exposed from the light absorbing layer 6 by face-down bonding via a bump 15 so that the light passing hole 42 opposes the light passing portion 6a of the light absorbing layer 6 and the light detecting portion 41 also opposes the light passing portion 6b of the light absorbing layer 6. Further, a flexible printed board 11 for taking out an output signal of the light detecting element 4 is electrically connected by wire bonding to the pad portions 9b exposed from the light absorbing layer 6. Then, an underfill material 12 for transmitting at least light L2 is filled in the body portion 2 side (in this instance, between the light detecting element 4 and the light-transmitting member $2_1$ or the light absorbing layer 6) of the light detecting element 4.

Figure 3:
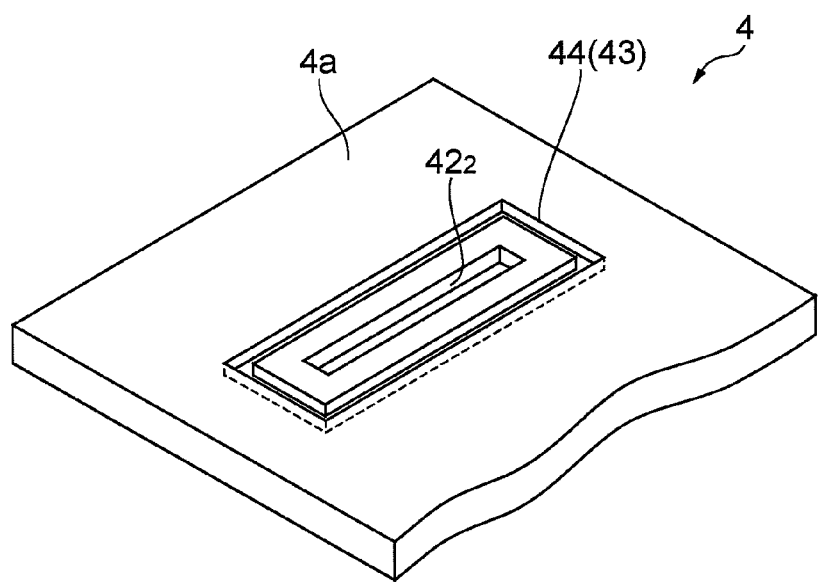
FIG. 3 is a perspective view showing the vicinity of a light passing hole of the light detecting element of the spectroscopy module 1 given in FIG. 1, when viewed from the body portion.
Figure 4:
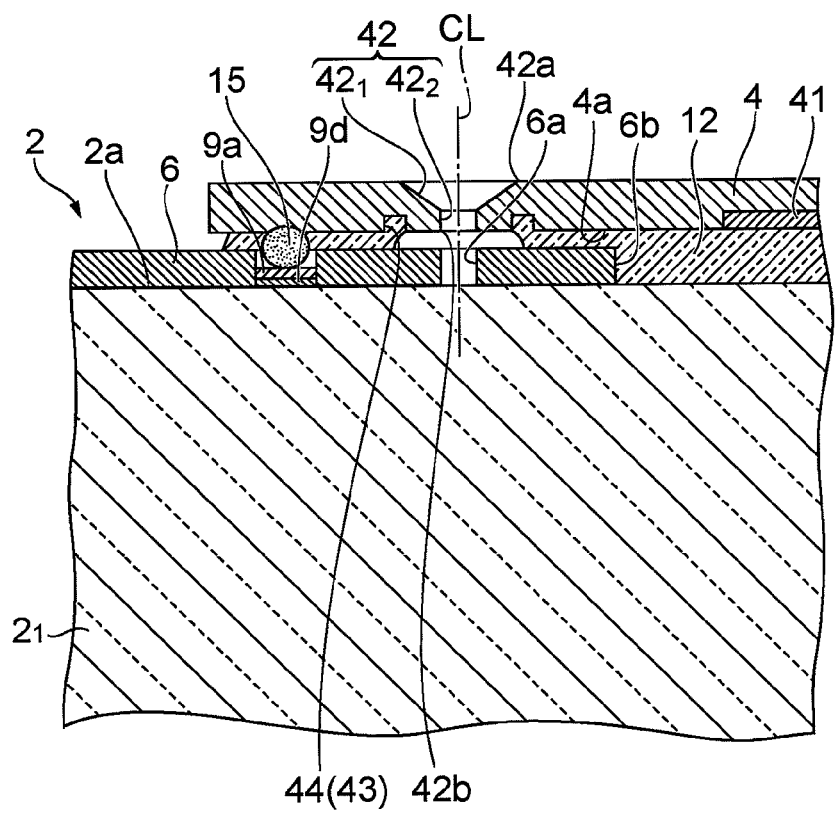
FIG. 4 is an enlarged cross sectional view showing the vicinity of a light passing hole of the spectroscopy module in FIG. 1.

FIG. 3 is a perspective view showing the vicinity of the light passing hole of the light detecting element of the spectroscopy module given in FIG. 1, when viewed from the body portion side. FIG. 4 is an enlarged cross sectional view showing the vicinity of the light passing hole of the spectroscopy module given in FIG. 1. As shown in FIG. 3 and FIG. 4, the light passing hole 42 is provided with a light incident-side portion $42_1$ for demarcating a light incident opening 42a from which light L1 is made incident and a light outgoing-side portion $42_2$ for demarcating a light outgoing opening 42b from which light L1 is made outgoing. The light outgoing-side portion $42_2$ is formed in a rectangular solid shape extending in a direction approximately orthogonal to the longitudinal direction of a light-transmitting member $2_1$ and the light incident-side portion $42_1$ is formed in a square pyramid shape widening from the light outgoing-side portion $42_2$ to the opposite direction. More specifically, the light passing hole 42 is formed in such a manner that the light incident opening 42a includes the light outgoing opening 42b, when viewed from the center line (CL) thereof.

A reservoir portion 43 is formed on a rear plane 4a of the body portion 2 side of the light detecting element 4 so as to enclose the light outgoing opening 42b. The reservoir portion 43 is constituted with a rectangular annular groove 44 formed so as to enclose the light outgoing opening 42b. A region enclosed by the groove 44, when viewed from the center line (CL) of the light passing hole 42, is greater in area than the light passing portion 6a of the light absorbing layer 6.

In the above-constituted spectroscopy module 1, light L1 is made incident from the front plane 2a of the body portion 2 into the body portion 2 via the light passing hole 42 of the light detecting element 4 and the light passing portion 6a of the light absorbing layer 6, advancing inside the light-transmitting members $2_1$, $2_2$ and arriving at the spectroscopic portion 3. The light L1 which has arrived at the spectroscopic portion 3 is dispersed into a plurality of lights L2 by the spectroscopic portion 3. The thus dispersed light L2 is reflected by the spectroscopic portion 3 on the front plane 2a side of the body portion 2, advancing inside the light-transmitting members $2_2$, $2_1$, arriving at the light detecting portion 41 of the light detecting element 4 via the light passing portion 6b of the light absorbing layer 6. The light L2 which has arrived at the light detecting portion 41 is detected by the light detecting element 4.

As so far described, in the spectroscopy module 1, the light passing hole 42 through which light L1 advancing to the spectroscopic portion 3 passes and the light detecting portion 41 for detecting light L2 dispersed and reflected by the spectroscopic portion 3 are formed at the light detecting element 4 in a state that they are positioned from each other at a high accuracy. It becomes unnecessary to install different members for forming the light passing hole 42 and to position between the light passing hole 42 and the light detecting portion 41 (more specifically, only the spectroscopic portion 3 is positioned with respect to the light detecting element 4). Therefore, it is possible to downsize the spectroscopy module 1 at a reduced cost.

Further, in the spectroscopy module 1, the light detecting element 4 is electrically connected to the wiring 9 formed on the front plane 2a side of the body portion 2 by face-down bonding, and an underfill material 12 for transmitting light L1, L2 is filled in the body portion 2 side of the light detecting element 4. As described so far, such a constitution is provided that the light detecting element 4 is electrically connected externally via the wiring 9 formed at the body portion 2. Thereby, for example, in a case where the flexible printed board 11 is directly connected to the light detecting element 4 (mechanically), a force applied to the flexible printed board 11 at the point of using the spectroscopy module 1 is not directly transferred to the light detecting element 4, thus making it possible to prevent the light detecting element 4 from receiving loads such as stress and also downsizing the light detecting element 4. Further, the underfill material 12 is filled in the body portion 2 side of the light detecting element 4, by which the body portion 2 and the light detecting element 4 can be improved in mechanical strength. It is also possible to adjust the refraction index on all channels through which light L1, L2 advancing between the body portion 2 and the light detecting element 4 pass.

Further, in the spectroscopy module 1, a groove 44 (reservoir portion 43) is formed on a plane 4a of the light detecting element 4 so as to enclose the light outgoing opening 42b of the light passing hole 42. Thereby, the underfill material 12 is reserved at the groove 44 (reservoir portion 43), or the underfill material 12 is reserved and also prevented from entering into the light passing hole 42. Thus, light can be made incident into the body portion 2, without being deflected or diffused by the underfill material 12.

Further, in the spectroscopy module 1, the wiring 9 is provided with a light absorbing layer 9d on the front plane 2a side of the body portion 2. Thereby, the wiring 9 is attached to the body portion 2 more firmly to prevent the wiring 9 from breaking or the like. Thus, even if the wiring 9 is formed directly on the front plane 2a of the body portion 2, the light absorbing layer 9d can be used to prevent stray light from being reflected in a diffused manner due to the wiring 9.

Further, in the spectroscopy module 1, there is formed on the front plane 2a of the body portion 2 a light absorbing layer 6 having a light passing portion 6a through which light L1 advancing to the spectroscopic portion 3 passes and a light passing portion 6b through which light L2 advancing to the light detecting portion 41 of the light detecting element 4 passes. The light absorbing layer 6 is used to suppress the generation of stray light and also absorb the stray light, thus making it possible to suppress the stray light from being made incident into the light detecting portion 41.

Still further, since the reservoir portion 43 is a groove 44 formed so as to enclose the light outgoing opening 42b, it is possible to form the reservoir portion 43 in a simple structure.

In addition, in the spectroscopy module 1, the groove 44 is formed so as to enclose the light passing portion 6a, when viewed from the center line (CL) of the light passing hole 42. Thereby, the underfill material 12 is reserved at the groove 44, or the underfill material 12 is reserved and also prevented from entering into the light passing portion 6a of the light absorbing layer 6. Thus, light can be made incident into the body portion 2, without being deflected or diffused by the underfill material 12.

Second Embodiment

A spectroscopy module 1 of a second embodiment is different from the spectroscopy module 1 of the first embodiment in the constitution of the reservoir portion 43 provided on the plane 4a side of the light detecting element 4.

Figure 5:
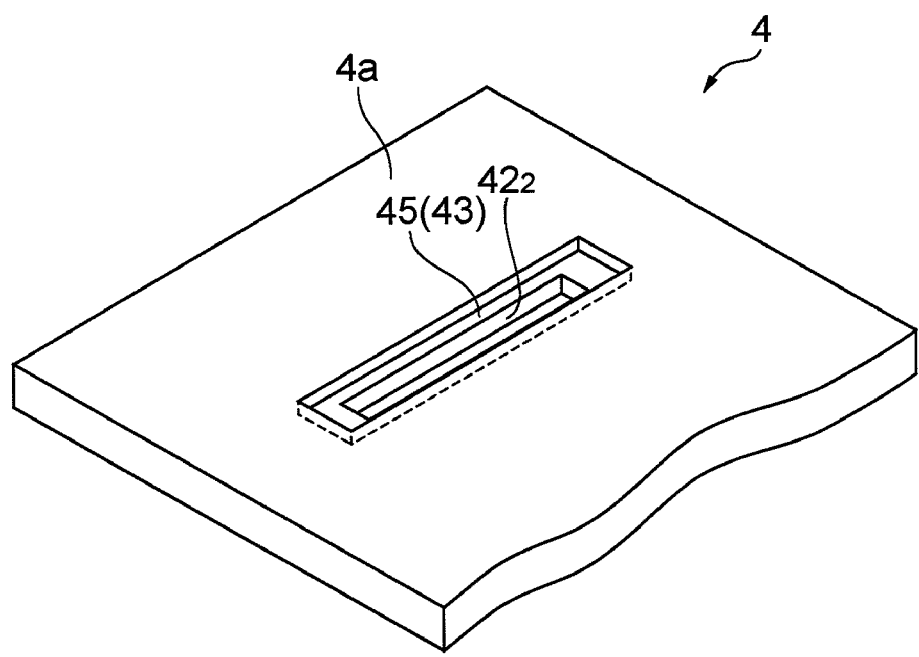
FIG. 5 is a perspective view showing the vicinity of a light passing hole of the light detecting element of a spectroscopy module of a second embodiment, when viewed from the body portion.
Figure 6:
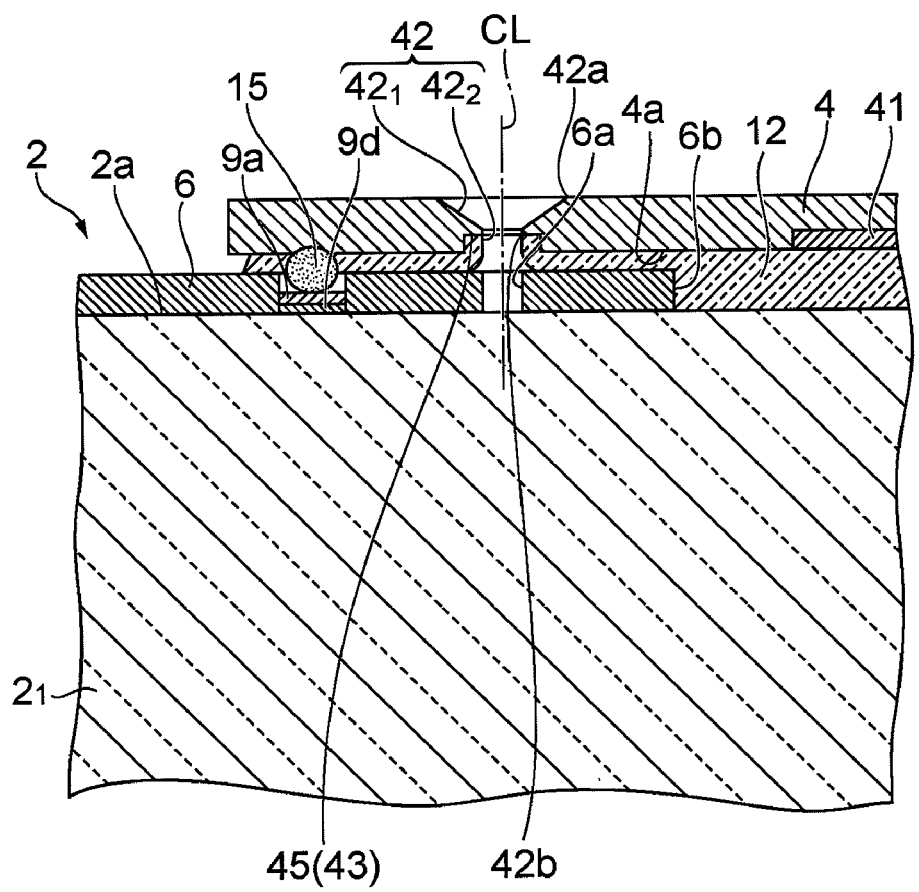
FIG. 6 is an enlarged cross sectional view showing the vicinity of a light passing hole of the spectroscopy module of the second embodiment.

FIG. 5 is a perspective view showing the vicinity of a light passing hole of the light detecting element of the spectroscopy module in the second embodiment when viewed from the body portion. FIG. 6 is an enlarged cross sectional view showing the vicinity of a light passing hole of the spectroscopy module in the second embodiment. In the light detecting element 4 of the spectroscopy module 1 of the second embodiment, as shown in FIG. 5 and FIG. 6, a reservoir portion 43 formed on the plane 4a of the light detecting element 4 is constituted with a rectangular recessed portion 45 formed so as to extend in a direction approximately orthogonal to the longitudinal direction of the light-transmitting member $2_1$ to include the light outgoing opening 42b. A part enclosed by the recessed portion 45 when viewed from the center line (CL) of the light passing hole 42 is greater in area than the light passing portion 6a.

As described so far, in the spectroscopy module 1, the recessed portion 45 is formed as the reservoir portion 43 on the plane 4a of the light detecting element 4 so as to include the light outgoing opening 42b of the light passing hole 42. Thereby, it is possible to form the reservoir portion 43 in a simple structure.

Further, in the spectroscopy module 1, the recessed portion 45 is formed so as to include the light passing portion 6a when viewed from the center line (CL) of the light passing hole 42. Thereby, an underfill material 12 is reserved at the recessed portion 45, or the underfill material 12 is reserved and also prevented from entering into the light passing portion 6a of the light absorbing layer 6. Thus, light can be made incident into the body portion 2, without being deflected or diffused by the underfill material 12.

The present invention shall not be limited to the above-described embodiments.

For example, the light absorbing layer 6 may be formed on the front plane 2a of the body portion 2, and the wiring 9 may be formed on the front plane of the light absorbing layer 6. In this instance, even if the wiring 9 is not provided on the light absorbing layer 9d, it is possible to prevent stray light from being reflected in a diffused manner due to the wiring 9.

The light-transmitting member $2_2$, which acts as a lens, may be formed integrally with the diffracting layer 14 by using light-transmitting low-melting temperature glass for replica molding or the like. In this instance, it is possible to simplify the production process and also prevent the deviation of relative positional relationship between the light-transmitting member $2_2$ and the diffracting layer 14.

INDUSTRIAL APPLICABILITY

According to the present invention, it is possible to improve the reliability.

The invention claimed is:

1. A spectroscopy module comprising: a light-transmitting body portion;
   a spectroscopic portion for dispersing light made incident from a predetermined plane of the body portion into the body portion, and reflecting the light on the predetermined plane;
   a light detecting element having a light detecting portion for detecting the light dispersed and reflected by the spectroscopic portion and an external terminal electrically connected to wiring via a bump, the wiring formed on the predetermined plane; and
   an underfill material filled in the body portion side of the light detecting element and capable of transmitting the light;
   wherein the light detecting element is provided with a light passing hole through which the light advancing into the spectroscopic portion passes,
   and a reservoir portion is formed so as to enclose a light outgoing opening of the light passing hole on a plane of the body portion side of the light detecting element.

2. The spectroscopy module as set forth in claim 1, wherein the wiring is provided on the predetermined plane with a light absorbing layer.

3. The spectroscopy module as set forth in claim 1, wherein a light absorbing layer having a first light passing portion through which the light advancing into the spectroscopic portion passes and a second light passing portion through which the light advancing into the light detecting portion passes is formed on the predetermined plane.

4. The spectroscopy module as set forth in claim 1, wherein the reservoir portion is an annular groove formed so as to enclose the light outgoing opening.

5. The spectroscopy module as set forth in claim 1, wherein the reservoir portion is a recessed portion formed so as to include the light outgoing opening.

6. The spectroscopy module as set forth in claim 3, wherein the reservoir portion is an annular groove formed so as to enclose the light outgoing opening.

7. The spectroscopy module as set forth in claim 6, wherein the groove is formed so as to enclose the first light passing portion when viewed from the center line of the light passing hole.

8. The spectroscopy module as set forth in claim 3, wherein the reservoir portion is a recessed portion formed so as to include the light outgoing opening.

9. The spectroscopy module as set forth in claim 8, wherein the recessed portion is formed so as to include the first light passing portion when viewed from the center line of the light passing hole.

* * * * *